Aug. 23, 1955  G. R. NORRIS  2,715,924
DEVICE FOR TURNING INTEGRAL DOWELS
Filed June 30, 1953  2 Sheets-Sheet 1
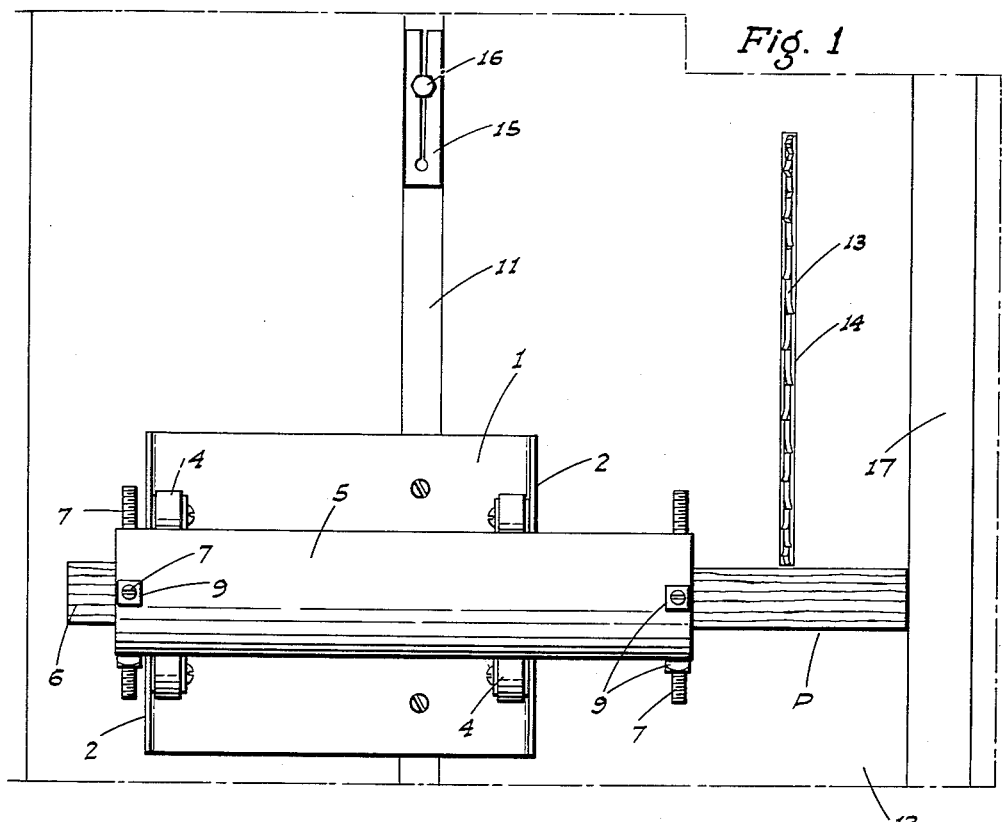
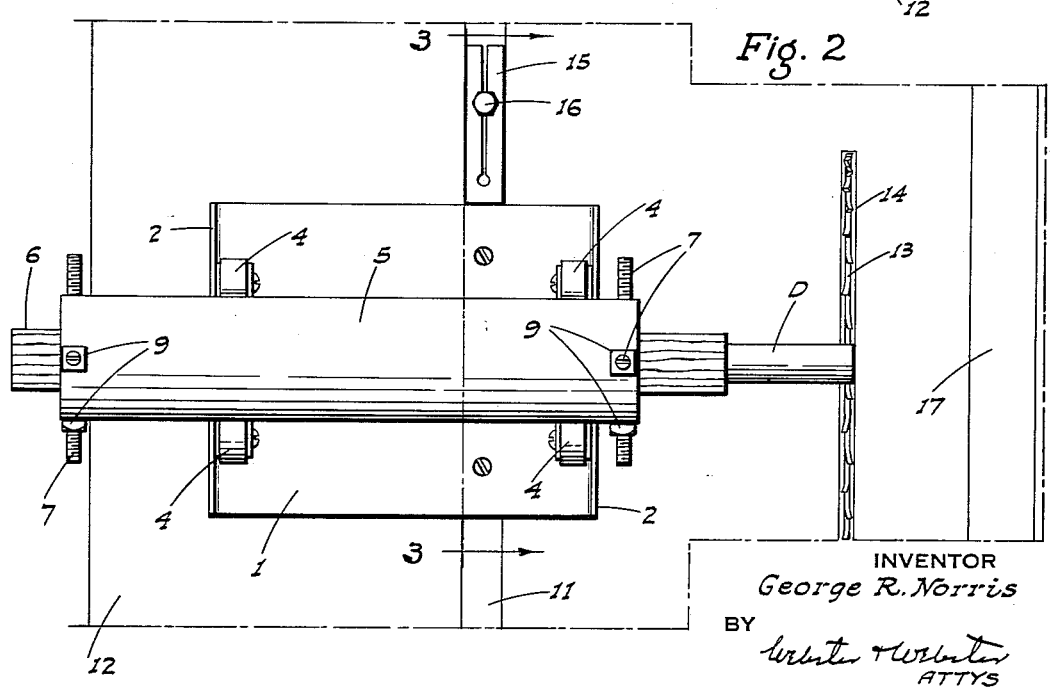
INVENTOR
George R. Norris
BY
*Webster + Webster*
ATTYS

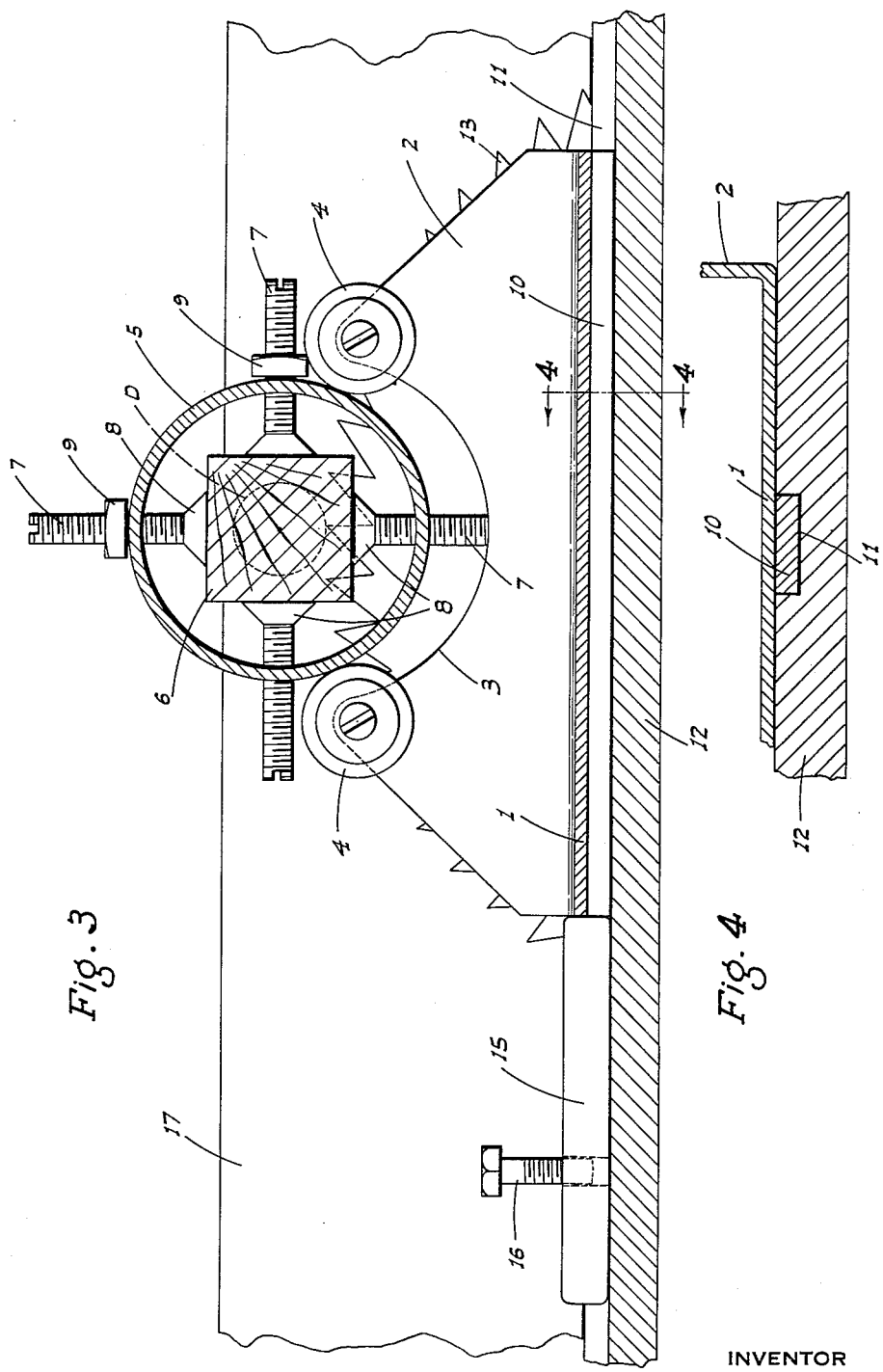

United States Patent Office 2,715,924
Patented Aug. 23, 1955

2,715,924

DEVICE FOR TURNING INTEGRAL DOWELS

George R. Norris, Stockton, Calif.

Application June 30, 1953, Serial No. 365,223

10 Claims. (Cl. 144—205)

The present invention is directed to, and it is a major object to provide, a novel, manually controlled device, adapted for use in connection with a table-type circular saw unit, for turning an integral dowel on the end of a wooden work piece, as—for example—on the end of a chair leg or a chair rung.

Another important object of the invention is to provide a device, for turning an integral dowel on the end of a wooden work piece, which comprises a horizontal, open-ended cylinder disposed laterally of, and at a right angle to, the circular saw blade; the work piece being secured lengthwise in the cylinder and projecting therefrom at one end toward, and for cutting engagement by, the circular saw blade, and the cylinder being mounted—in a novel manner—on the saw table for rotation, axial shifting, and forward and rearward motion. As so mounted the cylinder is capable of motions such that the projecting end portion of the work piece can be moved relative to, and in engagement with, the circular saw blade in a manner to cut an integral dowel on said end portion of the work piece.

An additional object of the invention is to provide a device, for the purpose described, which is easily manipulated, rapid in operation, and capable of producing duplicate pieces with accuracy.

A further object of the invention is to provide a device, for the purpose described, which can be readily applied to, or removed from, a conventional table-type circular saw unit.

It is also an object of the invention to provide a device, for the purpose described, which is designed for ease and economy of manufacture.

Still another object of the invention is to provide a practical and reliable device, for use in combination with a table-type circular saw unit, for turning an integral dowel on the end of a wooden work piece, and a device which will be exceedingly effective for the purpose for which it is designed.

These objects are accomplished by means of such structure and relative arrangement of parts as will fully appear by perusal of the following specification and claims.

In the drawings:

Fig. 1 is a plan view of the device in place on a table-type circular saw unit; the device being positioned with the projecting end portion of the wooden work piece as disclosed before any cutting thereof.

Fig. 2 is a similar view, but shows the device as positioned upon substantial completion of cutting of the integral dowel.

Fig. 3 is an enlarged sectional elevation on line 3—3 of Fig. 2.

Fig. 4 is a fragmentary transverse section on line 4—4 of Fig. 3.

Referring now more particularly to the drawings, and to the characters of reference marked thereon, the device comprises a horizontal, rectangular base plate 1, formed at opposite ends with integral, upstanding cradles 2; each including, at the top, an upwardly opening, semi-circular cutout 3, and a pair of transversely spaced, anti-friction bearing rollers 4 are journaled at the top of each cradle 2 on opposite sides of the cutout 3.

The cradles 2, including the rollers 4, support a horizontal, elongated, open-ended cylinder 5 for rotation and for axial sliding; such cylinder being of substantially greater length than the base plate 1.

The spacing of each pair of the rollers 4 is such that such rollers have peripheral contact with the cylinder 5 at points in a horizontal plane below the axis of said cylinder.

The wooden work piece, such as a chair leg or rung, is indicated at 6, and preparatory to the dowel cutting operation such wooden work piece 6 is secured centrally in the cylinder 5. The securing means comprises, at each end of the cylinder 5, four screws 7 disposed with 90° spacing therebetween and threaded radially through such cylinder. At their inner ends the screws 7 are formed with flat-faced heads 8 which bear against an adjacent side of the work piece 6. At least two of the screws 7, and preferably adjacent ones thereof, are provided with lock nuts 9, so that it is only necessary to loosen the remaining two screws 7 to remove one work piece 6 and replace another. The cylinder and screws, therefore, form a rotary and axially movable work clamping chuck.

Additionally, with two of the screws 7 locked in a given position, it is not only easy to center each work piece 6 in the cylinder 5, but each such work piece occupies exactly the same position in said cylinder as the preceding work piece. This is desirable to the end that duplicate dowel-ended pieces can be manufactured.

Each work piece 6 as secured in the cylinder 5 projects a substantial distance from one end of said cylinder; said projecting end portion being indicated at P.

The base plate 1 is fitted, on the under side, with a transverse guide bar 10 which is rectangular in cross section, and which is adapted to seat in slidable relation in the upwardly opening guide channel 11 conventionally existent in the top of the table 12 of a table type circular saw unit. The guide channel 11 is disposed laterally some distance from, but parallel to, the driven circular saw blade 13, which projects upwardly through a slot 14 in said table 12.

Thus, with the base plate 1 seated on the saw table 12 with the guide bar 10 slidably engaged in the guide channel 11, the cylinder 5 is disposed laterally of the driven circular saw blade 13 and at right angles to the latter.

In order to limit the extent at which the base plate 1 may slide forward on the saw table 12, a longitudinally split stop block 15 is engaged in the guide channel 11 at a predetermined point; such stop block being frictionally clamped in place by a screw 16 threaded into said block 15 in a manner to cause the same to expand laterally on opposite sides of the slit therein, and to bind in said channel 11.

In order to cut an integral dowel on the projecting end portion P of a wooden work piece 6 previously secured in the cylinder 5 in the manner heretofore described, the base plate 1 is disposed in a rearward position, with said projecting end portion P in clearance relation to the driven circular saw blade 13, as in Fig. 1. The fence 17, which the table type circular saw unit conventionally includes, is then set a selected distance from the driven circular saw blade 13; such setting determining the length of the dowel to be cut on the projecting end portion P of the work piece 6.

After such setting of the fence 17 the cylinder 5 is shifted axially in the direction of said fence, and until said projecting end portion P abuts the same.

Thereafter, with the driven circular saw blade 13 set to a predetermined height, the base plate 1 is slowly advanced by one hand of the operator, until the stop 15 is engaged. The stop 15 is set to prevent the base plate 1 from advancing beyond the point of top center contact of the saw blade 13 with the work.

After the initial cut, with one hand holding the base plate 1 advanced, the operator sweeps the other hand diagonally and recurringly in engagement across the top of the cylinder 5 in a direction which shifts the same axially away from the fence, while at the same time rotating said cylinder. With such axial shifting and rotation of the cylinder 5, the circular saw blade 13 effectively cuts a cylindrical, well-centered integral dowel D of predetermined diameter and length from said projecting end portion P of the work-piece 6, as clearly shown in Fig. 2.

With the described device, integral dowels can be turned or cut on the end of a wooden work-piece with rapidity and accuracy; changing of work-pieces in the cylinder 5 being a simple operation, as previously described, and which operation can be accomplished more readily by reason of the fact that said cylinder rests gravitationally on the rollers 4 and is merely manually removed for changing the work-piece.

Additionally, the length of the dowel D and its diameter are readily predetermined by the simple expedients of adjusting the spacing of the fence 17 from the saw blade 13, and adjustment of the extent of upward projection of said blade 13 above the table 12, respectively.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for use in combination with a table-type circular saw unit, to cut an integral dowel on one end portion of an elongated wooden work piece; the unit including a table and a driven circular saw blade projecting above said table, and said device comprising a mount adapted to rest on the table laterally of and for sliding motion parallel to the circular saw blade, said mount embodying a cradle assembly whose axis is parallel to that of the circular saw blade, a horizontal elongated cylinder supported on said cradle assembly for rotation about said axis and for sliding to and fro thereon, and means securing the work piece centrally in the cylinder with said end portion projecting across and for cutting engagement by the circular saw blade.

2. A device, as in claim 1, in which the cradle assembly includes pairs of transversely spaced anti-friction rollers disposed to support the cylinder on opposite sides thereof and at longitudinally spaced points.

3. A device, as in claim 1, in which said work piece securing means comprises, at longitudinally spaced points on the cylinder, a plurality of circumferentially spaced radial screws threaded through the cylinder, and work piece engaging heads on the inner ends of said screws.

4. A device for use in combination with a table-type circular saw unit, to cut an integral dowel on one end portion of an elongated wooden work piece; the unit including a table and a driven circular saw blade projecting above said table, and said device comprising a horizontal base plate adapted to rest on the table laterally of and for sliding motion parallel to the circular saw blade, alined but spaced cradles upstanding from the base plate, a horizontal elongated cylinder, the cradles being positioned to receive and rotatably and axially slidably support the cylinder laterally of the circular saw blade but parallel to the axis of the latter, and means securing the work piece centrally in the cylinder with said end portion projecting across and for cutting engagement by the circular saw blade.

5. A device for use in combination with a table-type circular saw unit, to cut an integral dowel on one end portion of an elongated wooden work piece; the unit including a table and a driven circular saw blade projecting above said table, and said device comprising a horizontal base plate adapted to rest on the table laterally of and for sliding motion parallel to the circular saw blade, alined but spaced cradles upstanding from the base plate, a horizontal elongated cylinder, the cradles being positioned to receive and rotatably and axially slidably support the cylinder laterally of the circular saw blade but parallel to the axis of the latter, and a plurality of circumferentially spaced holding screws threaded radially into the cylinder adjacent each end thereof whereby to secure the work piece centrally in the cylinder with said end portion projecting across and for cutting engagement by the circular saw blade.

6. A device, as in claim 5, in which all of said screws have flat-faced heads on the inner ends, and certain only of the screws have lock nuts thereon bearing against the cylinder.

7. A device for use in combination with a table-type circular saw unit, to cut an integral dowel on one end portion of an elongated wooden work piece; the unit including a table and a driven circular saw blade projecting above said table, and said device comprising a horizontal base plate adapted to rest on the table laterally of and for sliding motion parallel to the circular saw blade, the table including a guide channel extending in the direction of such motion, a guide on the under side of the base plate slidable in said channel, upstanding cradles at opposite ends of the base plate, said cradles being alined in a direction parallel to the axis of the circular saw blade and each including transversely spaced antifriction rollers, a horizontal elongated cylinder supported by the cradle rollers for rotation about an axis parallel to that of the circular saw blade and for to and fro axial sliding motion laterally of said blade, and means securing the work piece centrally in the cylinder with said end portion projecting across and for cutting engagement by the circular saw blade.

8. A device, as in claim 7, including a stop in the guide channel for engagement by said guide so as to limit forward sliding motion of the base plate on the saw table.

9. A dowel cutting unit comprising, with a horizontal-axis circular saw and a table above which the saw projects, a support resting on the table to one side of the saw and movable along the table in a direction at right angles to the axis of the saw, a rotary work-clamping chuck from one end of which the work projects, and means mounting the chuck on the support for rotation and axial movement parallel to the axis of the saw so that the axis of the chuck is above the topmost point of the saw and so that the projecting portion of the work may overhang the saw for engagement thereby.

10. A unit as in claim 9, with means engaged by the outer end of the chucked work when the latter is extended over the saw to limit the axial movement of the chuck in the direction of the saw.

References Cited in the file of this patent

UNITED STATES PATENTS

| 271,702 | Griggs | Feb. 6, 1883 |
| 369,262 | Sargent | Aug. 30, 1887 |
| 975,946 | Gilliam | Nov. 15, 1910 |
| 2,503,926 | Tobias | Apr. 11, 1950 |

FOREIGN PATENTS

| 8,748 | Great Britain | Apr. 14, 1898 |